United States Patent [19]
Seilly

[11] 3,795,153
[45] Mar. 5, 1974

[54] GEAR CHANGE MECHANISM
[75] Inventor: Alec Harry Seilly, North Wembley, England
[73] Assignee: C. A. V. Limited, Birmingham, England
[22] Filed: May 12, 1972
[21] Appl. No.: 252,741

[30] Foreign Application Priority Data
May 14, 1971 Great Britain.................... 15036/71

[52] U.S. Cl.................................... 74/335, 74/477
[51] Int. Cl........................... F16h 5/06, G05g 5/06
[58] Field of Search............................. 74/335, 477

[56] References Cited
UNITED STATES PATENTS
2,847,871   8/1958   Schick ................................. 74/477
2,931,237   4/1960   Backus................................. 74/335
3,040,601   6/1972   Lewis................................. 74/335 X
3,076,349   2/1963   Williams et al.................. 74/335 X Primary Examiner—Arthur T. McKeon
Attorney, Agent, or Firm—Holman & Stern

[57] ABSTRACT

A gear change mechanism for a multi ratio gearbox includes selector bars movable axially one at a time to effect engagement of a particular ratio of the gearbox, each bar having a groove with which can co-operate a plurality of balls to prevent movement of two of the bars from the neutral position when the other bar is in a ratio selecting position. There is also provided a spring loaded locking member movable between a pair of balls and which when operative arrests movement of the bars at the neutral positions.

11 Claims, 3 Drawing Figures

GEAR CHANGE MECHANISM

This invention relates to gear change mechanism for a multi ratio gearbox and of the kind comprising a selector bar movable in opposite directions from a neutral position, the bar being connected to gear selector members whereby when the bar is moved in one direction from its neutral position one gear ratio of the gearbox will be selected and when moved in the opposite direction from its neutral position another gear ratio of the gearbox will be selected, the gearbox when the bar is in the neutral position being in the neutral condition.

The object of the invention is to provide a gear change mechanism for use on such a gearbox.

According to the invention a gear change mechanism for a gear box of the kind specified comprises power operated actuating means operatively connected to said selector bar to effect movement thereof, said power operated actuating means being reversible whereby the bar can be moved in opposite directions, and locking mechanism operable to halt the movement of the bar at the neutral position.

One example of a gear change mechanism will now be described with reference to a mechanism for selecting the gears of a multi-speed gearbox having five forward gears and a reverse gear. The gearbox is of a conventional form having where appropriate, synchronising devices and the selection of each ratio is carried out by movement in one or the other direction of one of three selector bars. The bars are shown at 10, 11 and 12 in FIG. 1 and in the position shown in FIG. 1 the bars are each in the neutral position. Each bar can be moved in one or the other axial direction to effect selection of one of the gear ratios of the gearbox and each bar is provided or connected to selector members 9 to effect the actual engagement of the particular ratios. A portion of the gear mechanism being shown at 8. In the position shown in FIG. 1 each bar is in the neutral position so that none of the gear ratios of the gear box are selected.

Figure 2:
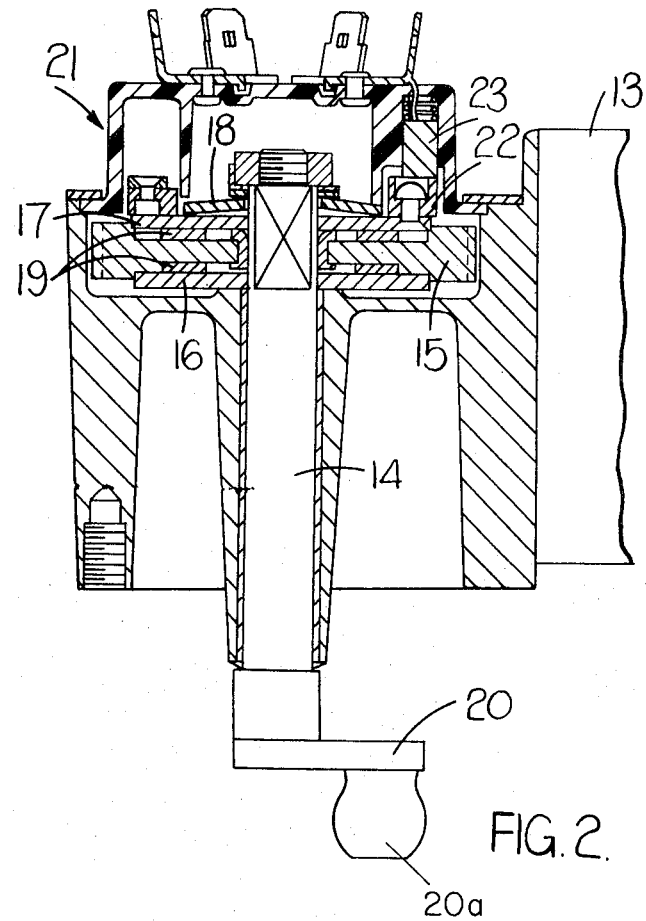
FIG. 2 is a sectional side elevation through another portion of the mechanism.
Figure 3:
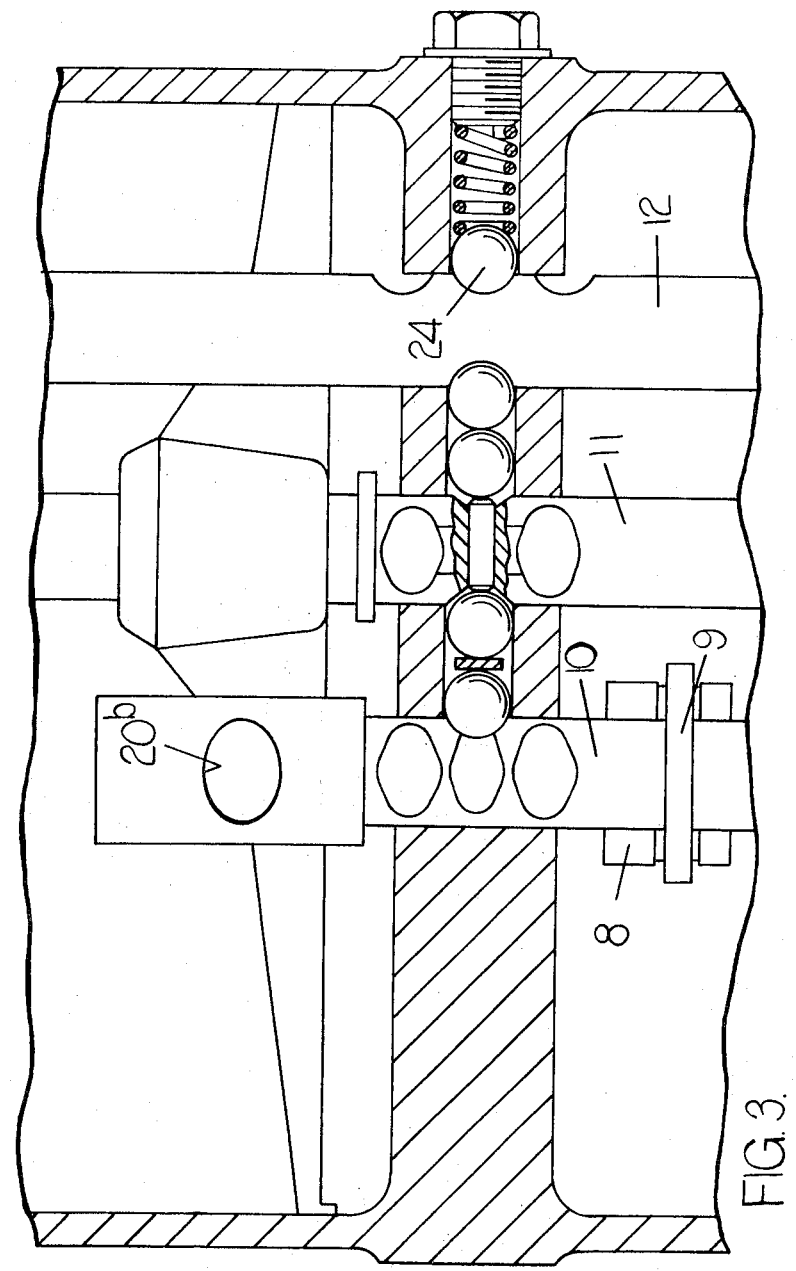
FIG. 3 is a part sectional plan view of the portion of the mechanism of FIG. 1.

For moving the bars in opposite directions three reversible electric motors are provided, one such motor and part of its associated drive mechanism, being shown in FIG. 2. The motor housing is indicated at 13 and the output shaft of the motor is coupled to a drive shaft 14 by means of a speed reduction mechanism which incorporates a peripherally toothed wheel 15 mounted about the shaft 14 and drivingly connected thereto through the intermediary of a clutch. The clutch comprises a plate 16 which is secured to the shaft 14 and a second plate 17 which is axially movable thereon. The plate 17 is urged towards the plate 16 by means of a spring washer 18 and the plates mount annular friction members 19 which bear against the web of the gear wheel 15.

The output shaft terminates in a crank arm 20 which is provided with a ball 20a of a ball and socket, the socket 20b being formed in a part mounted on the associated selector bar.

In operation, energisation of the motor will effect movement of the associated selector bar in an axial direction, the particular direction depending upon which way the motor armature rotates.

When the mechanism is in use, all the bars must be in the neutral position or one bar only may be in one of two extreme positions on opposite sides of the neutral position. It is essential therefore to ensure that the motor is switched off when the appropriate position is reached and for this purpose there is provided on the motor a switch mechanism 21. The mechanism is accommodated within a housing secured to the motor housing and the plate 17 has secured thereto an electrically insulating annular member 22 which carries contacts for engagement by brushes 23 supported in the switch housing. In addition the switch housing carries blades for connection of the switches into external electric circuit means. This circuit means includes a manually operable selector switch whereby the direction of rotation of one of the three motors can be determined so as to effect engagement of the particular gear ratio. In addition the circuit means ensures that before one selector bar can be moved the other two selector bars are in the neutral position.

With such an arrangement it will be appreciated that the motor and parts connected thereto will have considerable inertia so that the arm 20 and therefore the associated selector bar will continue to move even when the supply of electric circuit to the motor is removed. This does not matter when the bars are moving towards their extreme positions however, it is of considerable importance when the bars are being moved to their neutral position. It is possible for the inertia to carry the bar past the true neutral position and a locking mechanism which is shown in FIG. 1 is provided to prevent over-run of the bars beyond the neutral position.

Figure 1:
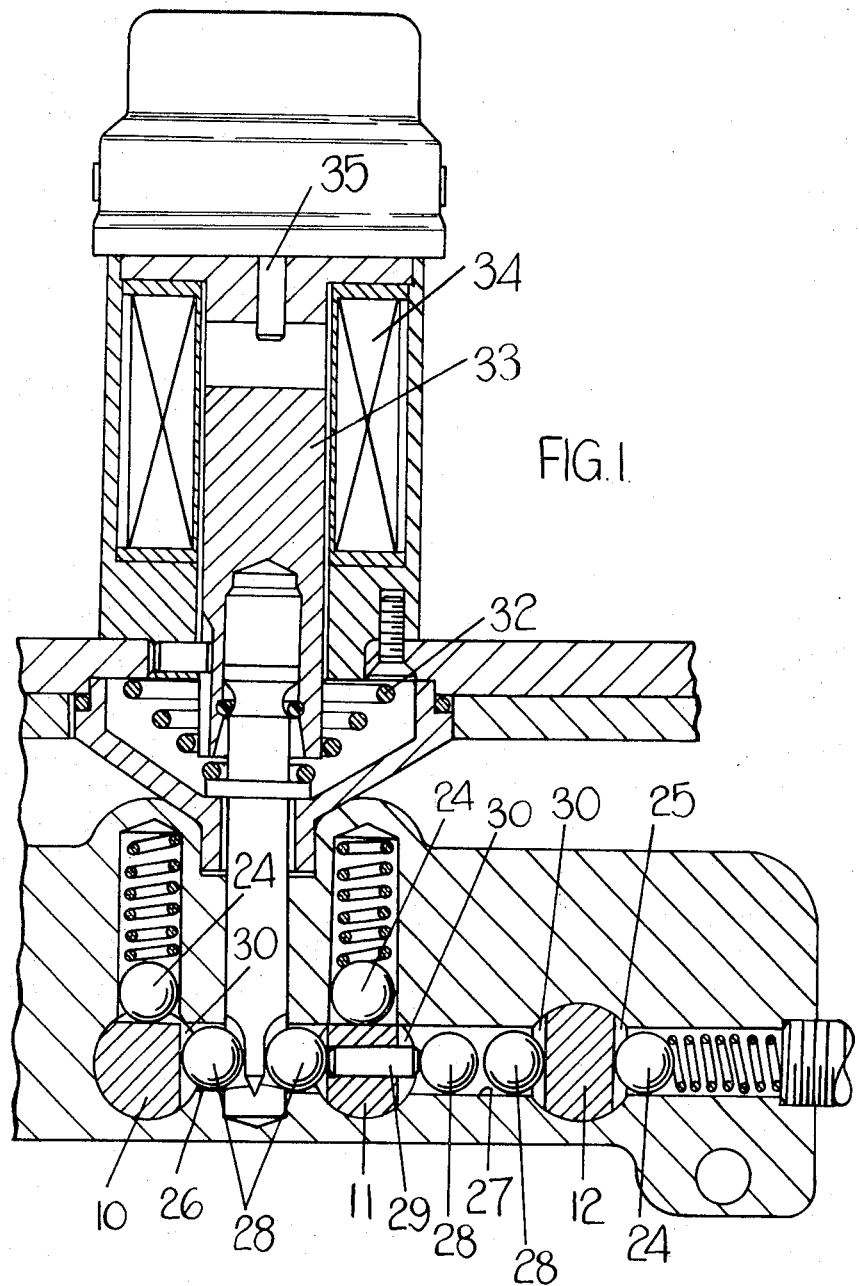
FIG. 1 is a sectional side elevation through a portion of a gear change mechanism.

With reference to FIG. 1 there is associated with each selector bar a spring loaded ball 24 which locates in one of three grooves 25 disposed in spaced relationship on each selector bar. The provision of such a ball is of course very well known and forms no part of the present invention.

Each selector bar is slidably accommodated within a bore, the axes of the three bores extending substantially parallel to each other. Moreover, between the inner and the two outer bores, extend a pair of further bores 26, 27 and each of these bores accommodates a pair of balls 28. The central selector bar 11 is provided with a transversely slidable push piece 29 positioned so that its ends can contact the adjacent balls 28 in the bores 26 and 27.

Each selector bar is provided with grooves 30 to partly accommodate the respective balls 28 and it will be noted that the bar 11 is provided with grooves 30 on its opposite sides. Moreover, movable between the balls 28 in the bore 26 is a tapered locking member 31 which is axially movable and which is spring loaded by means of a spring 32, to the position in which it is shown, In this position and with each bar in the neutral position, the balls 28 in the bore 26 are accommodated within the respective grooves 30 of the bars 10 and 11. Moreover, the push piece 29 transmits movement to the balls 28 which are accommodated in the bore 27, to prevent movement of the bar 12. Therefore before any one of the bars can be moved, the locking member 31 must be moved axially against the action of the spring 32. When this occurs one only of the selector bars may be moved axially and during this movement the balls 28 will move appropriately to prevent movement of the other two bars.

In order to prevent one of the bars overshooting the neutral position the locking member 31 prior to movement of the bar towards the neutral position, is allowed to move under the action of its spring to effect separation of the balls 28 in the bore 26. In fact such separation cannot occur until all the bars are in the neutral position. As the moving bar attains the neutral position the balls 28 move appropriately to allow the locking member 31 to take up the position shown. Once this position is attained no further movement of the bar can take place so that it is effectively halted and locked in the neutral position.

The locking member 31 is connected to a solenoid armature 33, the solenoid having a winding 34. When the winding is energised the armature 33 is moved upwardly and moves the locking member 31 against the action of the spring 32. A certain amount of lost motion is permitted between the armature and the locking member 31 to allow the armature to move rapidly. Moreover, at its extreme position the armature 33 engages a switch actuating member 35, the switch forming part of the circuit means.

It will be appreciated that various modifications can be made to the mechanism described above. For instance the gear reduction mechanism associated with the motor may be replaced by some other form of mechanism such for instance as a mechanism which provides a linear movement upon operation of the electric motor.

I claim:

1. A gear change mechanism comprising a selector bar movable in opposite directions from a neutral position, the bar being connected to gear selector members of an associated gear box whereby when the bar is moved in one direction from its neutral position one gear ratio of the gearbox will be selected and when moved in the opposite direction from its neutral position another gear ratio of the gearbox will be selected, an electric power operated actuating means operatively connected to said selector bar to effect movement thereof, said power operated actuating means being reversible whereby the bar can be moved in opposite directions, and locking mechanism operable to halt the movement of the bar at the neutral position.

2. A mechanism as claimed in claim 1 in which said locking mechanism comprises a groove on the selector bar, a locking member, a locking part movable by said locking member into said groove on the selector bar when the bar reaches the neutral position, thereby to prevent further movement of the bar, and resilient means for loading said locking member to move said locking part.

3. A mechanism as claimed in claim 2 including means operable to effect movement of said spring loaded member to permit movement of the bar.

4. A mechanism as claimed in claim 3 in which said means comprises a solenoid having an armature connected to said spring loaded member.

5. A mechanism as claimed in claim 4 including means providing lost motion between the armature and said member.

6. A mechanism as claimed in claim 5 in which said locking part comprises a ball.

7. A mechanism as claimed in claim 6 comprising a further selector bar position in spaced side by side relationship with the first mentioned bar, said further selector bar also having a groove with which can co-operate a locking part in the form of a ball, said spring loaded locking member being insertable between said balls to effect locking of both bars in the neutral position.

8. A mechanism as claimed in claim 7 including a passage extending between the selector bars, said balls being located in said passage, the balls and grooves being chosen in relation to the length of the passage such that when one bar is moved from the neutral position the other bar will be held in the neutral position.

9. A mechanism as claimed in claim 8 including an additional bar which is disposed parallel to but spaced from the other bars, a push member located in the central one of said bars, said push member transmitting motion between the balls intermediate the first mentioned and the further selector bars and further balls disposed between the additional bar and the central one of said bars.

10. A mechanism as claimed in claim 3 in which said electric power operated actuating means comprises an electric motor.

11. A mechanism as claimed in claim 10 in which said motor includes a reduction mechanism incorporating an overload clutch.

* * * * *